United States Patent
Lim

(10) Patent No.: US 9,181,967 B2
(45) Date of Patent: Nov. 10, 2015

(54) COUPLER

(71) Applicant: Su-I Lim, New Taipei (TW)

(72) Inventor: Su-I Lim, New Taipei (TW)

(*) Notice: Subject to any disclaimer, the term of this patent is extended or adjusted under 35 U.S.C. 154(b) by 0 days.

(21) Appl. No.: 13/923,550

(22) Filed: Jun. 21, 2013

(65) Prior Publication Data

US 2014/0105678 A1    Apr. 17, 2014

(30) Foreign Application Priority Data

Oct. 24, 2012    (TW) .............................. 101139236 A

(51) Int. Cl.
| | |
|---|---|
| F16B 2/02 | (2006.01) |
| F16B 7/04 | (2006.01) |
| F16D 1/02 | (2006.01) |
| F16B 7/18 | (2006.01) |
| E04C 5/16 | (2006.01) |
| F16B 7/02 | (2006.01) |

(52) U.S. Cl.
CPC . *F16B 7/18* (2013.01); *E04C 5/165* (2013.01); *F16B 7/025* (2013.01); *F16B 7/182* (2013.01); *Y10T 403/67* (2015.01)

(58) Field of Classification Search
CPC ......... Y10T 403/67; F16B 7/025; F16B 7/18; F16B 7/182; E04C 5/165
USPC ................... 403/313, 314, 373, 374.1–374.4; 24/136 B, 136 R, 122.6; 52/848, 849, 52/223.13
See application file for complete search history.

(56) References Cited

U.S. PATENT DOCUMENTS

| | | | | |
|---|---|---|---|---|
| 1,429,263 | A * | 9/1922 | Wolfe | 294/86.31 |
| 2,233,794 | A * | 3/1941 | Noble | 403/369 |
| 3,163,904 | A * | 1/1965 | Ziolkowski | 403/365 |
| 4,899,499 | A * | 2/1990 | Hoekstra | 52/146 |
| 5,393,165 | A * | 2/1995 | Rowan, Jr. | 403/301 |
| 5,594,977 | A * | 1/1997 | McCallion | 24/136 B |

(Continued)

FOREIGN PATENT DOCUMENTS

| | | |
|---|---|---|
| TW | 322928 | 12/1997 |
| TW | M272824 U | 8/2005 |

(Continued)

OTHER PUBLICATIONS

Communication From the Taiwan Patent Office Regarding a Counterpart Foreign Application Dated (Taiwan Year 104) Feb. 16, 2015.

(Continued)

*Primary Examiner* — Gregory Binda
*Assistant Examiner* — Nahid Amiri
(74) *Attorney, Agent, or Firm* — Rosenberg, Klein & Lee

(57) ABSTRACT

A coupler includes a first hollow sleeve, a plurality of tapered clamps and a second hollow sleeve. The first hollow sleeve is formed with a first inner threaded portion on the inner face of one end while the other end thereof a tapered face. The diameter of tapered face increases toward the first inner threaded portion. The outer face of each tapered clamp is formed with a second tapered face, which contacts the first tapered face. The inner face of each tapered clamp has a plurality of teeth conforming to one end portion of the first bar. One end of the second hollow sleeve is formed with a first outer threaded portion and the first outer threaded portion conforms to the first inner threaded portion. The second hollow sleeve is formed with a second inner threaded portion, which matches a second outer threaded portion of the second bar.

10 Claims, 4 Drawing Sheets

(56) References Cited

U.S. PATENT DOCUMENTS

| | | | |
|---|---|---|---|
| 6,234,709 B1* | 5/2001 | Sorkin | 403/374.1 |
| 7,624,556 B2* | 12/2009 | Plooksawasdi | 52/851 |
| 7,819,388 B2* | 10/2010 | McCallion | 254/29 A |
| 7,823,258 B2* | 11/2010 | Tegg | 24/136 R |
| 7,841,140 B1* | 11/2010 | Sorkin | 52/223.13 |
| 8,051,615 B2* | 11/2011 | Mathews et al. | 52/223.13 |
| 8,286,309 B2* | 10/2012 | Landry | 24/136 B |
| 2008/0302035 A1* | 12/2008 | Shin | 52/223.13 |
| 2009/0304441 A1 | 12/2009 | Landry | |

FOREIGN PATENT DOCUMENTS

| | | |
|---|---|---|
| TW | M385581 U | 8/2010 |
| TW | M424368 U | 3/2012 |

OTHER PUBLICATIONS

Communication From the Taiwan Patent Office Regarding a Counterpart Foreign Application Dated (Taiwan Year 104) Jan. 27, 2015.

\* cited by examiner

COUPLER

BACKGROUND

1. Field of the Invention

The instant disclosure relates to a coupler; in particular, to a coupler connecting a first bar and a second bar.

2. Description of Related Art

As economy develops, the average ground area per person occupied is greatly reduced and therefore skyscrapers are a popular type of building. If reinforcement bars are tied by the conventional iron wires, the reinforcement bars rely mainly on the concrete to be held in place. In the case of severe earthquake, the concrete and reinforcement bars are easily driven apart, resulting in fatal danger. On a construction site, the space for bundling reinforcement bars is too narrow to properly carry out such procedure and thus the quality is not easy to control. Hence, reinforcement bar couplers are developed to solve the abovementioned problems in the construction site.

Reinforcement bar couplers are widely used in building construction. The reinforcement bar couplers help to stabilize the elongated reinforcement bars. A great variety of reinforcement bars is available, including hydraulic sleeve coupler, threaded coupler, expanded coupler, friction weld coupler, molting metal filling coupler, concrete filling coupler, and epoxy filling coupler. The abovementioned couplers require further construction on site and the quality is not easy to control.

To address the above issues, the inventor strives via associated experience and research to present the instant disclosure, which can effectively improve the limitation described above.

SUMMARY OF THE INVENTION

The instant disclosure provides a coupler connecting a first bar and a second bar.

According to one exemplary embodiment of the instant disclosure, the coupler includes a first hollow sleeve, a plurality of tapered clamps and a second hollow sleeve. One end of the first hollow sleeve is formed with a first inner threaded portion on the inner face. The other end of the first hollow sleeve is formed with a first tapered face on the inner face. The interior diameter of the first tapered face increases toward the first inner threaded portion. The outer face of each tapered clamp is formed with a second tapered face. The second tapered face contacts the first tapered face. The plurality of tapered clamps surrounds the first bar. The inner face of each tapered clamp has a plurality of teeth. The teeth are in conformity with one end portion of the first bar. One end of the second hollow sleeve is formed with a first outer threaded portion on the outer face. The first outer threaded portion and the first inner threaded portion are in conformity. The inner face of the second hollow sleeve is formed with a second inner threaded portion. The second inner threaded portion is in conformity with a second outer threaded portion of the second bar.

Another embodiment of the instant disclosure provides a bar coupler, including a first hollow sleeve, a plurality of tapered clamps and a second hollow sleeve. One end of the first hollow sleeve is formed with a first inner threaded portion on the inner face. The other end of the first hollow sleeve is formed with a first tapered face on the inner face. The interior diameter of the first tapered face increases toward the first inner threaded portion. The outer face of each tapered clamp is formed with a second tapered face. The second tapered face contacts the first tapered face. The outer face of each tapered clamp is formed with a slot. The plurality of slots is arranged collectively as an annular slot. The inner face of each tapered clamp has a plurality of teeth surrounding the first bar. The teeth are in conformity with one end portion of the first bar. One end of the second hollow sleeve is formed with a first outer threaded portion on the outer face. The first outer threaded portion and the first inner threaded portion are in conformity. The inner face of the second hollow sleeve is formed with a second inner threaded portion. The second inner threaded portion is in conformity with a second outer threaded portion of the second bar.

Still another embodiment of the instant disclosure provides a bar coupler, including a first hollow sleeve, a plurality of tapered clamps and a second hollow sleeve. One end of the first hollow sleeve is formed with a first inner threaded portion on the inner face. The other end of the first hollow sleeve is formed with a first tapered face on the inner face. The interior diameter of the first tapered face increases toward the first inner threaded portion. The first hollow sleeve is formed with a receiving space. The receiving space is also defined by the plurality of tapered clamps and the second hollow sleeve. The outer face of each tapered clamp has a second tapered face. The second tapered face contacts the first tapered face. The plurality of tapered clamps surrounds the first bar. The inner face of each tapered clamp has a plurality of teeth. The teeth are in conformity with one end portion of the first bar. One end of the second hollow sleeve is formed with a first outer threaded portion on the outer face. The first outer threaded portion and the first inner threaded portion are in conformity. The inner face of the second hollow sleeve is formed with a second inner threaded portion. The second inner threaded portion is in conformity with a second outer threaded portion of the second bar.

The instant disclosure provides an easily assembled coupler in a space-limited construction site. As a result, the construction quality is improved due to less uncontrolled construction variants. In addition, the engagement strength is enhanced and mass production reduces manufacturing cost. The quality and efficiency of reinforcement bar connection work are greatly increased whereas the cost is decreased.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

First Embodiment

Figure 1:
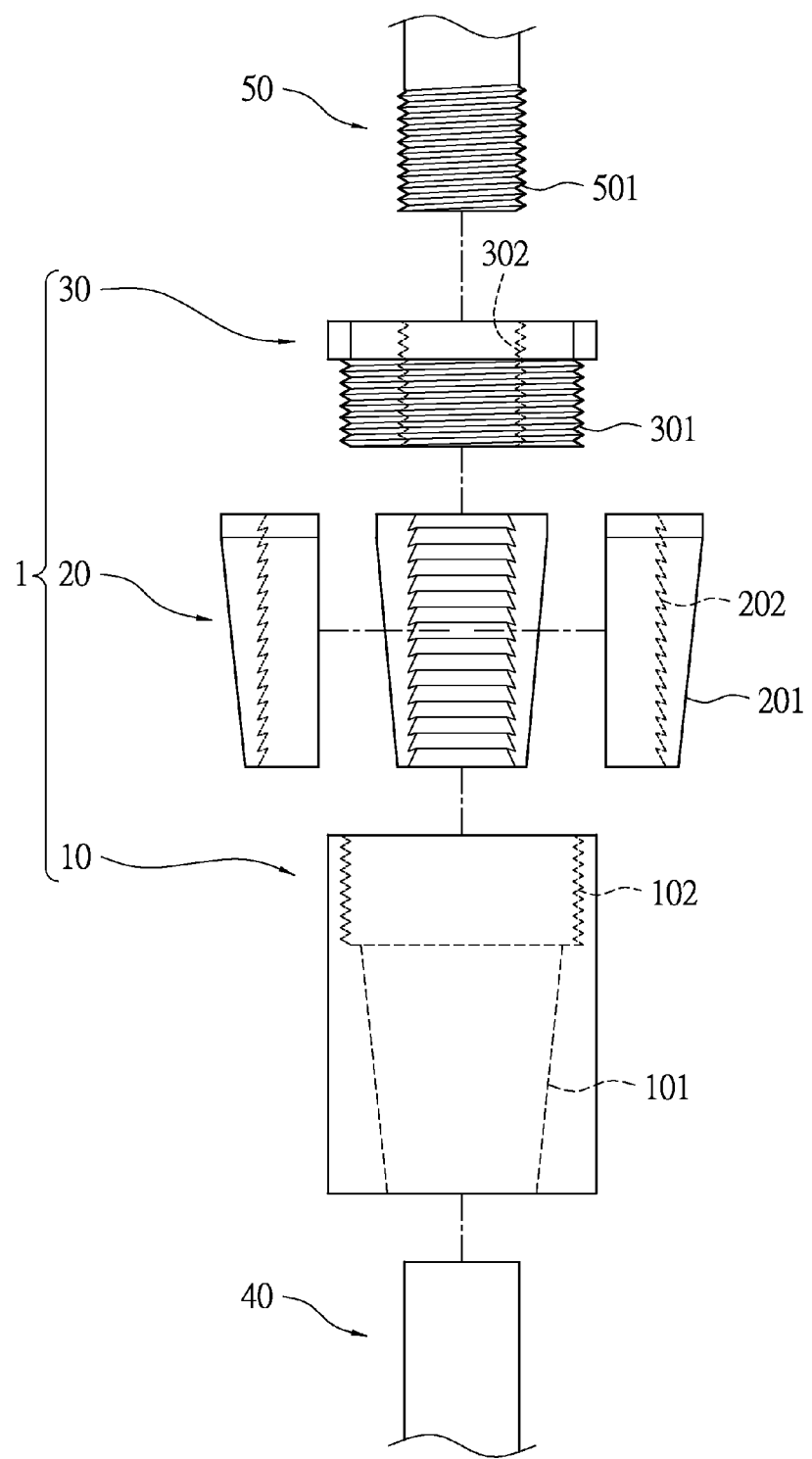
FIG. 1 is an exploded view of a coupler in accordance with a first embodiment of the instant disclosure.
Figure 2:
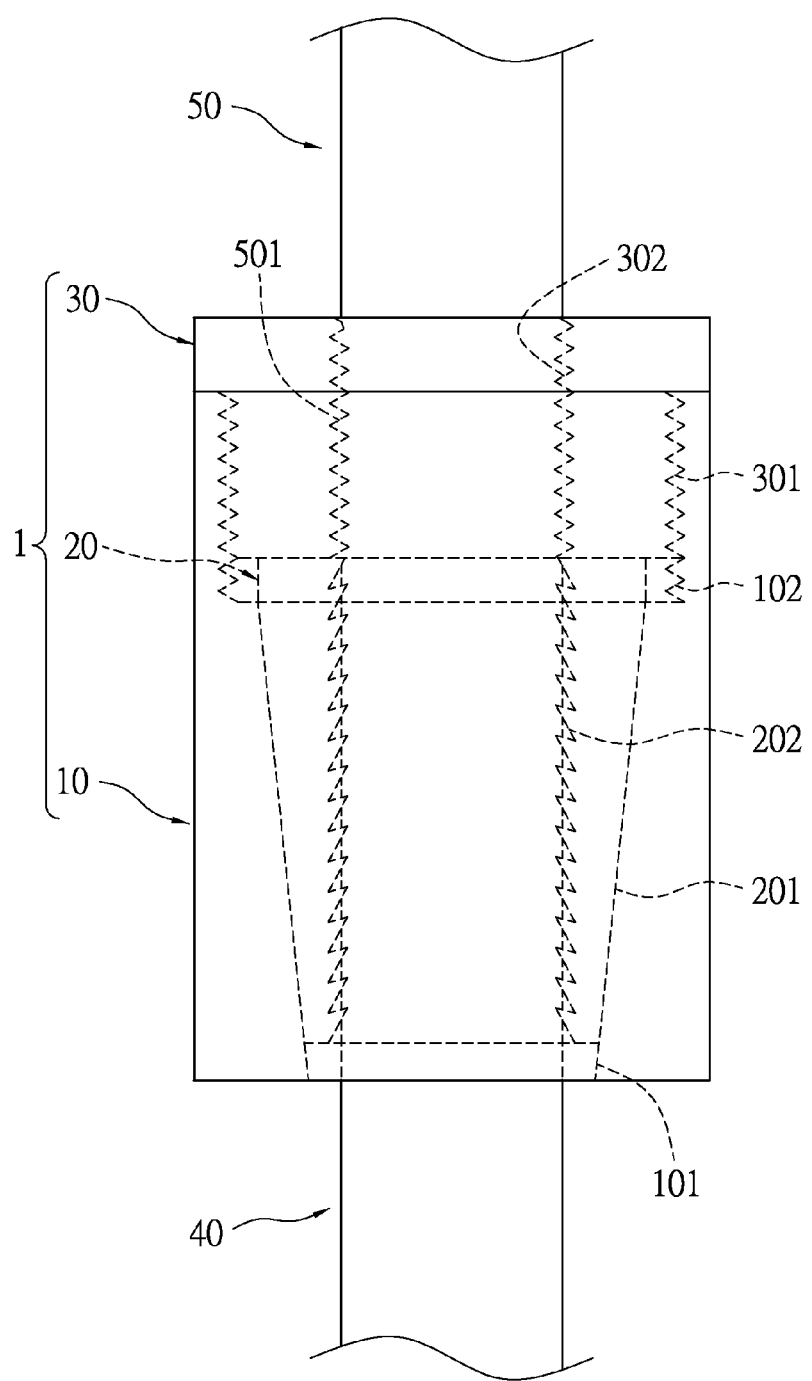
FIG. 2 is a schematic diagram of a coupler in accordance with a first embodiment of the instant disclosure.

Please refer to FIGS. 1 and 2. FIG. 1 is an exploded view of the first embodiment while FIG. 2 is a schematic diagram of the assembled first embodiment. The first embodiment of the instant disclosure provides a coupler 1. The coupler 1 connects a first bar 40 and a second bar 50. The coupler 1 includes a first hollow sleeve 10, a plurality of tapered clamps 20 and a second hollow sleeve 30.

One end of the first hollow sleeve 10 is formed with a first inner threaded portion 102 on the inner face. The other end of the first hollow sleeve 10 is formed with a tapered face 101 on the inner face. The interior diameter of the tapered face 101 increases toward the first inner threaded portion 102. In the instant embodiment, the first hollow sleeve 10 receives an end portion of the first bar 40. Specifically, the first hollow sleeve 10 can be made of low carbon steel, medium carbon steel or tool steel and the material thereof is not limited thereto.

Furthermore, the outer face of each tapered clamp 20 is formed with a second tapered face 201. The second tapered face 201 contacts the first tapered face 101. The plurality of tapered clamps 20 surrounds the first bar 40. The inner face of each tapered clamp 20 has a plurality of teeth 202. The teeth 202 are in conformity with one end portion of the first bar 40.

In the instant embodiment, the amount of tapered clamps 20 can be two, three or four. The second tapered face 201 and the first tapered face 101 are in close contact. The plurality of teeth 202 is slantingly inserted to the end portion of the first bar 40 as a hook clutching an object. Specifically, the plurality of teeth bites the end portion of the first bar 40 to prevent the first bar 40 from sliding off. It is worth noting that the tapered clamps 20 can be made of low carbon steel, medium carbon steel or tool carbon steel and the material thereof is not limited thereto.

More specifically, referring to FIG. 2, the slope of the first tapered face 101 is greater or equal to the slope of the second tapered face 201. Therefore, the first bar 40 can make contact within the first hollow sleeve 10 because the slope of the second tapered face 201 is smaller than the slope of the first tapered face 101.

Additionally, one end of the second hollow sleeve 30 is formed with a first outer threaded portion 301 on the outer face. The first outer threaded portion 301 and the first inner threaded portion 102 are fittingly matched. The inner face of the second hollow sleeve 30 is formed with a second inner threaded portion 302. The second inner threaded portion 302 is in conformity with a second outer threaded portion 501 on one end of a second bar 50. In the instant embodiment, the first and second bars 40, 50 are reinforcement bars.

Second Embodiment

Figure 3:
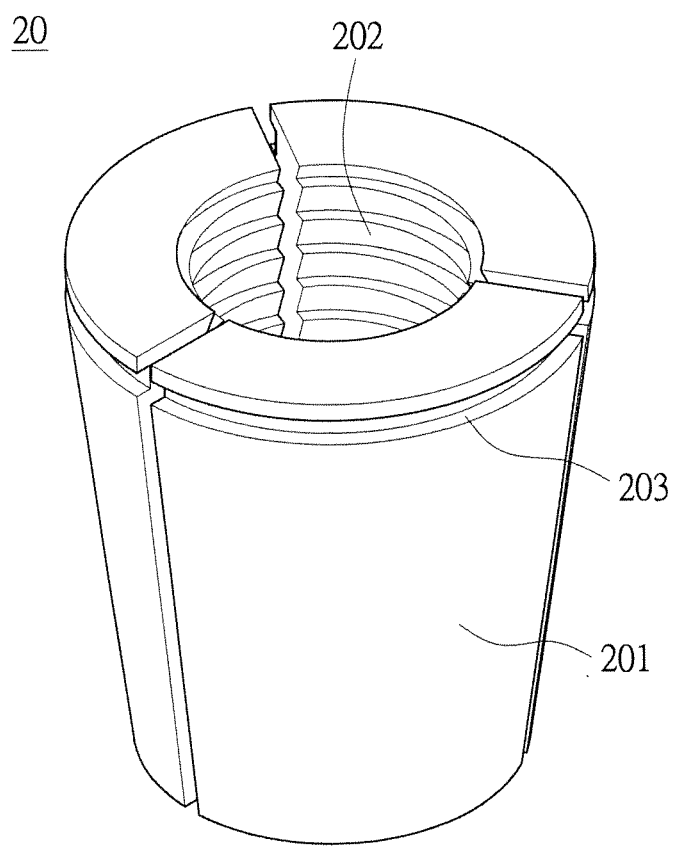
FIG. 3 is a perspective view of tapered clamps of a coupler in accordance with a second embodiment of the instant disclosure.

Please refer to FIG. 3. FIG. 3 is a perspective view of tapered clamps of the second embodiment. The second embodiment of the instant disclosure provides a coupler connecting a first bar 40 and a second bar 50. The coupler includes a first hollow sleeve 10, a plurality of tapered clamps 20 and a second hollow sleeve 30. The first and second hollow sleeves 10, 30 are identical to the previous embodiment and the description thereof is omitted herein. The second embodiment is different from the first embodiment because each tapered clamp 20 is formed with a slot 203.

Specifically, the outer face of each tapered clamp 20 is formed with a second tapered face 201. The second tapered face 201 contacts the first tapered face 101. The plurality of tapered clamps 20 surrounds the first bar 40. The inner face of each tapered clamp 20 has a plurality of teeth 202. The teeth 202 are in conformity with one end portion of the first bar 40.

In the instant embodiment, the amount of tapered clamps 20 can be two, three or four. The second tapered face 201 and the first tapered face 101 are in close contact. The plurality of teeth 202 is slantingly inserted to the end portion of the first bar 40 as a hook clutching an object. Specifically, the plurality of teeth bites the end portion of the first bar 40 to prevent the first bar 40 from sliding off.

The outer face of each tapered clamp 20 is formed with a slot 203. The plurality of slots 203 is arranged to form an annular slot portion. The slot portion receives an O-gasket. Moreover, the slot portion can be continuous or discrete. Specifically, the tapered clamps 20 can be made of low carbon steel, medium carbon steel or tool steel and the material thereof is not limited thereto.

More specifically, referring to FIG. 2, the slope of the first tapered face 101 is greater or equal to the slope of the second tapered face 201. Therefore, the first bar 40 can make contact within the first hollow sleeve 10 because the slope of the second tapered face 201 is smaller than the slope of the first tapered face 101.

Comparing FIGS. 2 and 3, the difference between the first and second embodiment lies in the slot portion of the second embodiment. In the second embodiment, the outer face of each tapered clamp 20 is formed with the slot 203. The plurality of slots 203 is arranged to form the annular slot portion for receiving the O-gasket.

For example, upon assembly, the plurality of tapered clamps 20 surrounds the first bar 40. The inner face of each tapered clamps 20 has the plurality of teeth 202. The plurality of teeth 202 is slantingly inserted to the end portion of the first bar 40 as a hook clutching an object. Subsequently, the O-gasket is disposed in the slot portion formed by the plurality of slots 203 for securing the tapered clamps 20 on the surface of the first bar 40. Hence, the tapered clamps 20 do not easily detach in the presence of the O-gasket.

Third Embodiment

Figure 4:
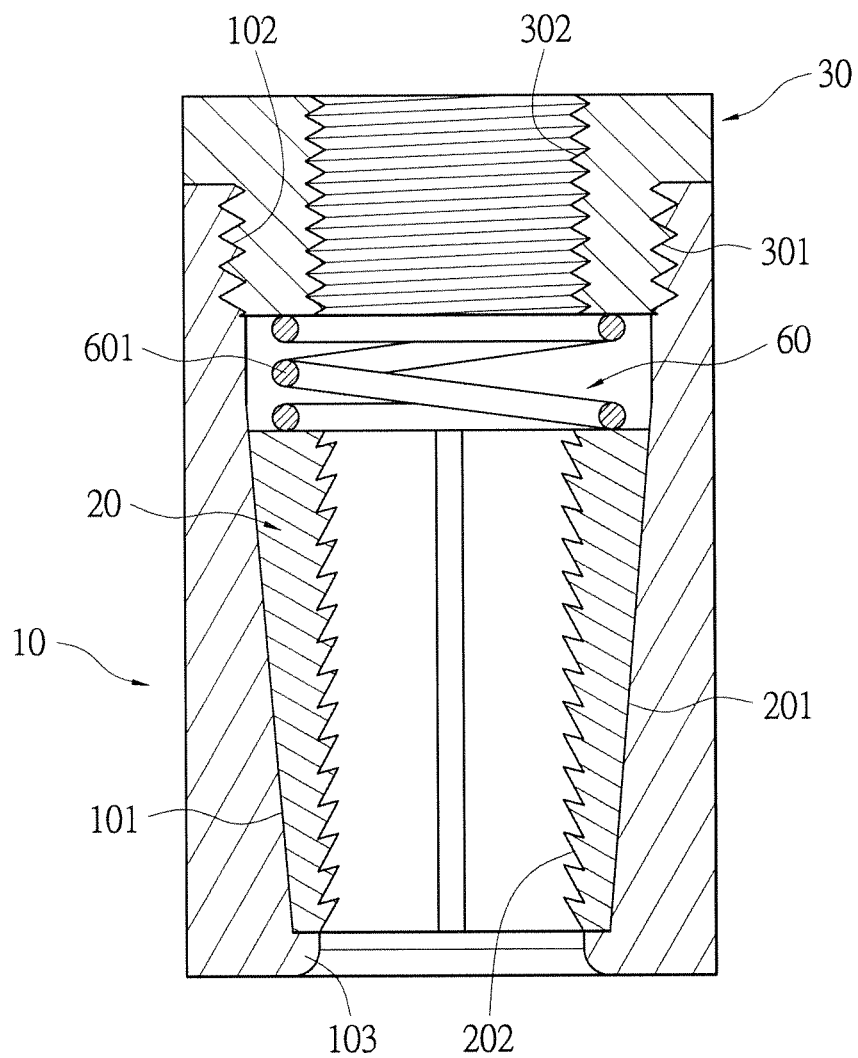
FIG. 4 is a cross-sectional view of a coupler in accordance with a third embodiment of the instant disclosure.

Please refer to FIG. 4. FIG. 4 is a cross-sectional view of the third embodiment. The third embodiment of the instant disclosure provides a coupler connecting a first bar 40 and a second bar 50. The coupler includes a first hollow sleeve 10, a plurality of tapered clamps 20 and a second hollow sleeve 30. The plurality of tapered clamps 20 and the second hollow sleeve 30 are identical to the previous embodiment and the description is omitted herein. The difference between the first and third embodiment arises from a receiving space 60 formed by the first hollow sleeve 10 in the third embodiment.

Specifically, one end of the first hollow sleeve 10 is formed with a first inner threaded portion 102 on the inner face. The other end of the first hollow sleeve 10 is formed with a first tapered face 101 on the inner face. The inner diameter of the first tapered face 101 increases toward the first inner threaded portion 102.

In the instant embodiment, the first hollow sleeve 10 receives an end portion of the first bar 40. It is worth noting the first hollow sleeve 10 is formed with the receiving space 60. The plurality of tapered clamps 20 and the second hollow sleeve also define the receiving space 60.

An elastic member 601 is disposed in the receiving space 60. The elastic member 601 abuts the plurality of tapered clamps 20. The elastic member 601 is made of compression spring. In addition, the first hollow sleeve 10 can be made of low carbon steel, medium carbon steel or tool steel and the material thereof is not limited thereto.

Furthermore, referring to FIG. 2, the slope of the first tapered face 101 is greater or equal to the slope of the second tapered face 201. Therefore, the first bar 40 can make contact with the first hollow sleeve 10 because the slope of the second tapered face 201 is smaller than the slope of the first tapered face 101.

Specifically, the elastic member 601 provides a force against the tapered clamps 20, therefore driving the tapered clamps 20 toward the first bar 40.

The inner side proximate to the exit, away from the first inner threaded portion 102, of the first hollow sleeve 10 is formed with an inner protrusion 103. The inner protrusion 103 is used to resist the force generated from the elastic member 601 and the plurality of tapered clamps 20. The mechanical strength of the first hollow sleeve 10 is therefore enhanced.

Comparing FIGS. 3 and 4, the difference between the second and third embodiments lies in the receiving space 60. In the third embodiment, the first hollow sleeve 10 is formed with the receiving space 60, which is also defined by the plurality of tapered clamps 20 and the second hollow sleeve 30. The elastic member 601 is disposed in the receiving space 60 for abutting the plurality of tapered clamps 20. The elastic member 601 is a compression spring.

In conclusion, the coupler can be easily assembled in a space limited construction site, therefore minimizing uncontrolled variants in a construction work. The coupler provides improved connection strength between bars and mass production reduces the cost thereof. Thus, the engineering quality and efficiency are increased while the cost is decreased.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A coupler for connecting a first bar and a second bar comprising:
    a first hollow sleeve formed with a first inner threaded portion and a first tapered face respectively on each end of the inner face, the inner diameter of the first tapered face increasing toward the first inner threaded portion;
    a plurality of tapered clamps, an outer face of each tapered clamp formed with a second tapered face contacting the first tapered face, the plurality of tapered clamps and having a plurality of teeth therewithin; and
    a second hollow sleeve formed with a first outer threaded portion on one end of the outer face and a second inner threaded portion on the inner face, the first outer threaded portion and the first inner threaded being in conformity, wherein the tapered clamps are surrounded by the first hollow sleeve and the second hollow sleeve, and the tapered clamps are detachably connected to the first hollow sleeve and the second hollow sleeve, wherein the first hollow sleeve and the second hollow sleeve directly contact the tapered clamps.

2. The coupler according to claim 1, wherein the slope of the first tapered face is greater than or equal to the slope of the second tapered face.

3. The coupler according to claim 1, wherein the first hollow sleeve is formed with a receiving space collectively defined by the plurality of tapered clamps and the second hollow sleeve.

4. The coupler according to claim 3, further comprising: an elastic member abutting the plurality of tapered clamps.

5. The coupler according to claim 1, wherein the first hollow sleeve is formed with an inner protrusion away from the first inner threaded portion, and the inner protrusion abutting one end portion of the plurality of the tapered clamps.

6. The coupler according to claim 1, wherein the outer face of each tapered clamp is formed with a slot and the plurality of slots are arranged to form an annular slot portion.

7. The coupler according to claim 6, wherein the annular slot portion receives an O-gasket.

8. The coupler according to claim 1, wherein the amount of tapered clamps is three.

9. The coupler according to claim 1, wherein the amount of tapered clamps is four.

10. The coupler according to claim 1, wherein the second hollow sleeve is formed with an indented slot at one end, and the tapered clamps are embedded into the indented slot.

* * * * *